Feb. 21, 1950  H. S. BOWEN  2,498,241
ARC SPOT WELDING APPARATUS
Filed Jan. 28, 1949  2 Sheets-Sheet 1
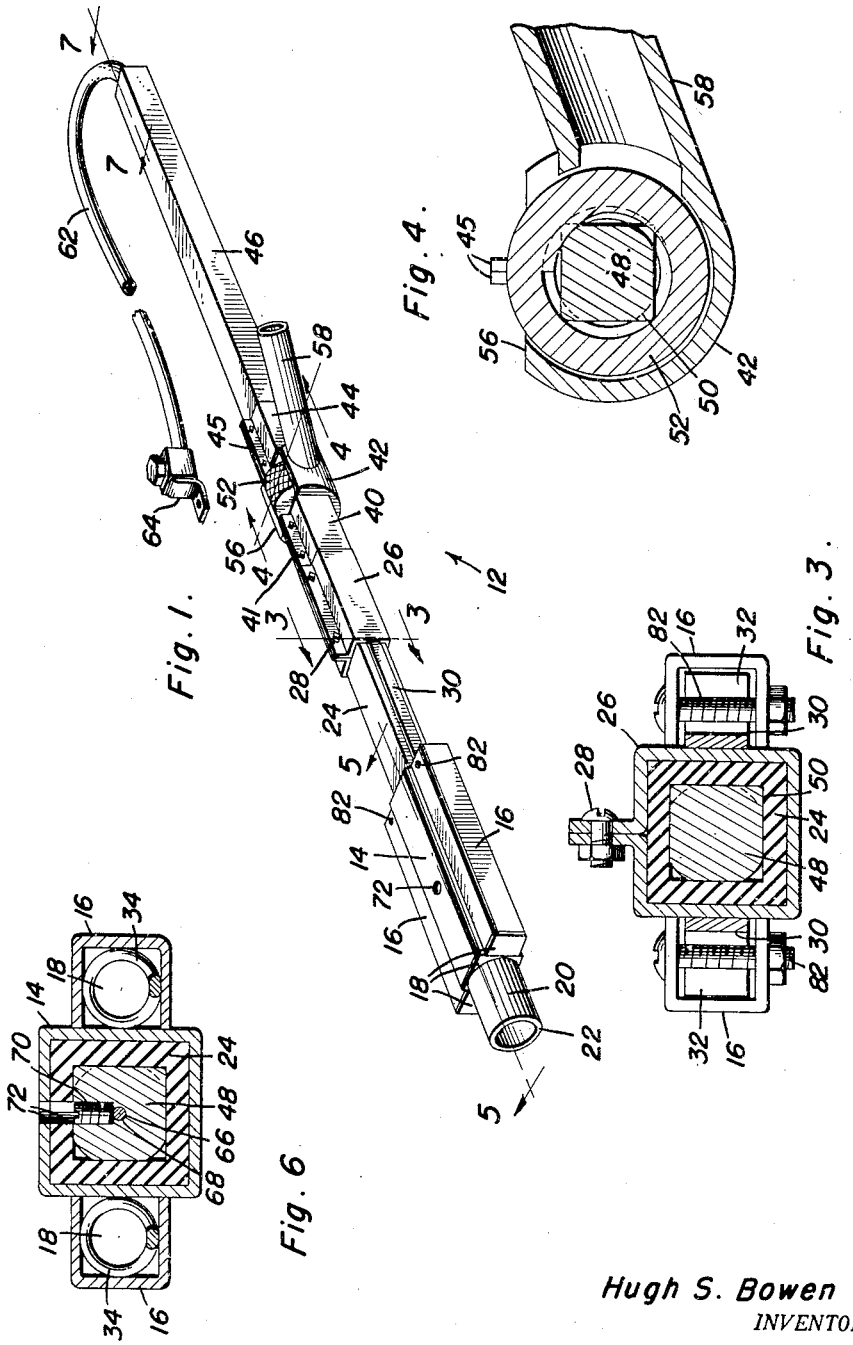
Hugh S. Bowen
INVENTOR.
BY Clarence A. O'Brien
and Harvey B. Jacobson
Attorneys

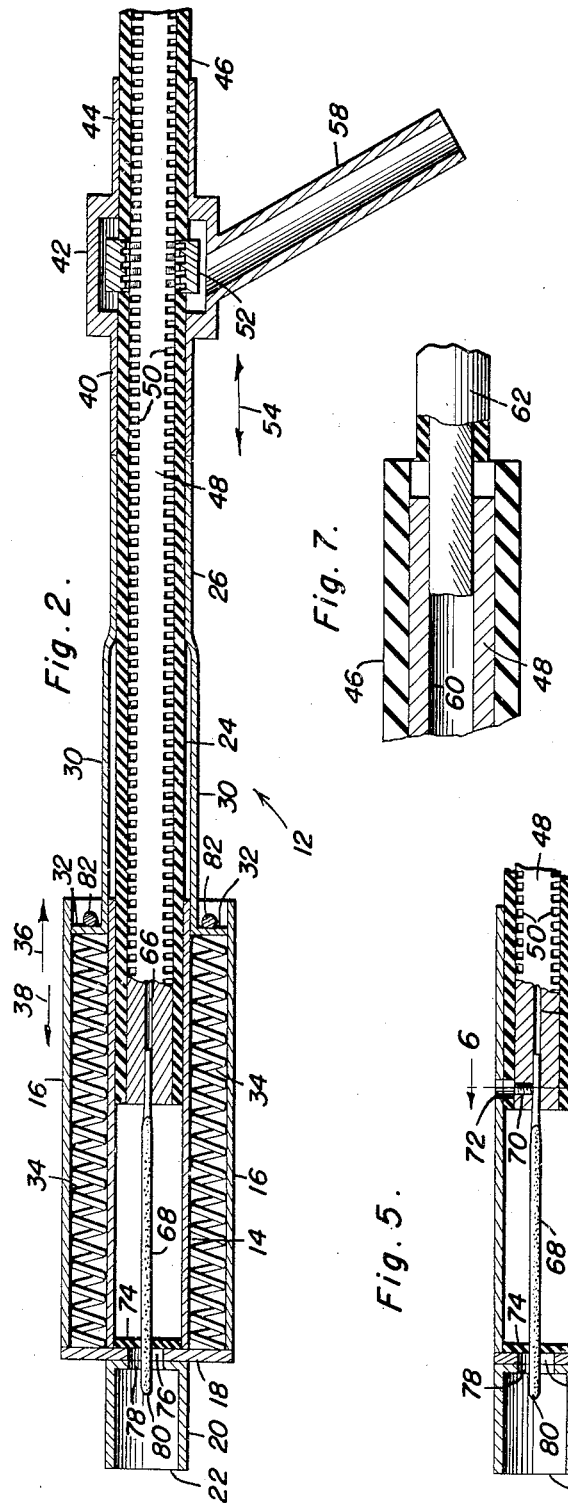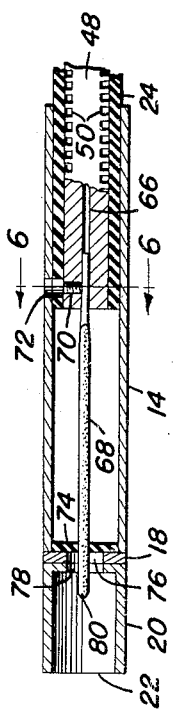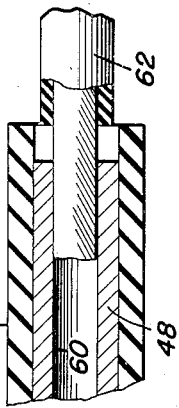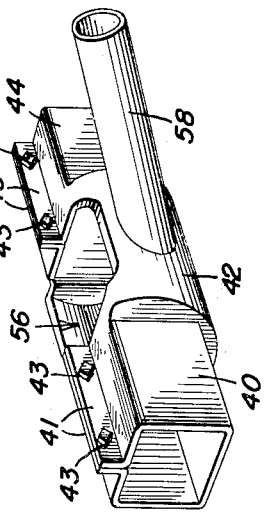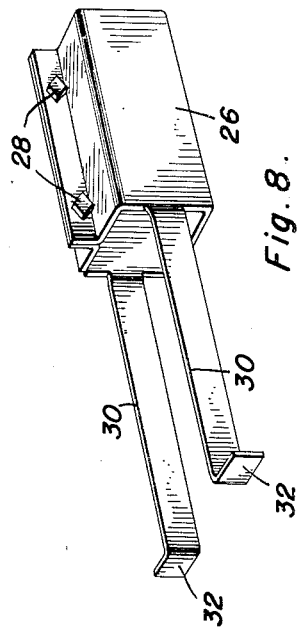
Hugh S. Bowen
INVENTOR.

Patented Feb. 21, 1950

2,498,241

UNITED STATES PATENT OFFICE 2,498,241

ARC SPOT WELDING APPARATUS

Hugh S. Bowen, Fairfield, Ala., assignor of forty-nine per cent to Walter B. Bowen, El Paso, Tex.

Application January 28, 1949, Serial No. 73,334

2 Claims. (Cl. 219—8)

This invention relates to new and useful improvements and structural refinements in arc spot welding apparatus, and the principal object of the invention is to provide an apparatus of the structure herein described, such as may be conveniently and effectively employed for expeditious fabrication of metallic structures, such as for example, sheet metal houses, garages, and the like.

In particular, the invention contemplates the provision of an apparatus for "tacking" together two or more layers of metal, and an important feature of the invention resides in the provision of means for retaining the pieces of work in contact for a short period of time after the tacking operation is completed, so that the bond between the pieces of metal has an adequate opportunity to become set and secure.

Another feature of the invention involves the provision of means for compensating for the diminishing length of the welding electrode, these means being readily adjustable and facilitating usage of almost the entire length of the electrode with the minimum amount of waste.

A still further feature of the invention lies in the provision of a chamber adjacent the work engaging end of the electrode, so that the electric arc incidental to the tacking operation is confined to the chamber and does not injure the sight of the operator or bystanders.

Some of the advantages of the invention reside in its simplicity of construction, in its convenient portability, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a perspective view of the invention;

Figure 2 is a fragmentary longitudinal cross sectional view thereof;

Figure 3 is a cross sectional view, taken substantially in the plane of the line 3—3 in Figure 1;

Figure 4 is a cross sectional view, taken substantially in the plane of the line 4—4 in Figure 1;

Figure 5 is a fragmentary cross sectional view, taken substantially in the plane of the line 5—5 in Figure 1;

Figure 6 is a cross sectional view, taken substantially in the plane of the line 6—6 in Figure 5;

Figure 7 is a fragmentary cross sectional view, taken substantially in the plane of the line 7—7 of Figure 1;

Figure 8 is a perspective view of a pressure exerting member used in the invention, and Figure 9 is a perspective view of a handle member used therein.

Like characters of reference are employed to designate like parts in the specification and throughout the several views.

Referring now to the accompanying drawings in detail, the invention consists of an arc spot welding apparatus designated generally by the reference character 12, the same embodying in its construction an elongated guide member 14 which is preferably polygonal in cross sectional configuration and is provided at opposite sides thereof with a pair of longitudinally extending channel-like pockets 16.

One end of the guide member 14 is open, while its remaining end is equipped with an end wall 18 on which is suitably secured a substantially tubular extension or chamber 20 having an open work-engaging end or edge 22.

An elongated sleeve 24, preferably polygonal in cross section to suit the guide member 14 and formed from suitable insulating material, has one end portion thereof slidable in the guide 14, a major portion of this sleeve protruding outwardly from the guide member and carrying what may be referred to as a pressure exerting member 26. The member 26 is preferably of a box-shaped configuration as is best shown in Figure 8, and actually assumes the form of a clamp which, by means of suitable screws 28, may be firmly secured on an intermediate portion of the sleeve 24, substantially as shown. It is to be noted that the member 26 is equipped with a pair of spaced parallel fingers 30 which are disposed at the sides of the sleeve 24 and terminate at their free ends in angulated extremities or pads 32. Each of these pads is slidably disposed in one of the aforementioned pockets 16, and it is to be noted that the end plate 18 of the guide member 14 is extended laterally so as to close the ends of the pockets 16, as is best shown in Figure 2. Suitable compression springs 34 are provided in the pockets 16 between the plate 18 and the pads 32, whereby the fingers 30 together with the associated member 26 and the sleeve 24 are urged outwardly from the guide member 14, as indicated at 36 in Figure 2. Conversely, if the sleeve 24 is assumed to be stationary, the springs 34 urge the guide member 14 in the direction of the arrow 38, as will be clearly apparent.

The outer end portion of the sleeve 24 is firmly secured into a polygonal socket 40 of a handle member 42, the latter being also provided with a further socket 44 which is axially aligned with the socket 40 and is intended to securely receive therein a sleeve extension 46. If desired, the sockets 40, 44 may be longitudinally split and provided with sets of ears or wings 41, 45 respectively, these being equipped with clamping screws 43 whereby the members 24, 46 may be firmly secured in their respective sockets. The extension 46, like the sleeve 24, is formed from insulating material, and an electrode holder 48 is slidable in the sleeve 24 and extension 46, substantially as shown. This electrode holder, although being polygonal in cross sectional configuration so as to be non-rotatably but slidably received in the elements 24, 46, is provided with an interrupted screw-thread 50, the "root" of which is, of course, circular in cross section so as to operatively accommodate an externally knurled adjusting nut 52.

This nut is disposed on the holder 48 between the sleeve 24 and the sleeve extension 46, so that by simply rotating the nut, the holder 48 may be slid in the elements 24, 46, as indicated by the arrow 54 in Figure 2. The elements 24, 46 are, of course, firmly held in the sockets 40, 44 respectively of the handle member 42, and it is to be noted that the intermediate portion of the handle member is sufficiently large to freely and rotatably accommodate the adjusting nut 52. Moreover, one side of the handle member 42 is open as at 56, so that the nut may be conveniently rotated. It may be explained at this point that the intermediate portion of the member 42 is also equipped with a laterally projecting handle 58, the purpose of which will be hereinafter described.

The outer end portion of the holder 48 is provided with an axial bore 60 in which an end portion of a suitable conductor may be firmly secured (see Figures 1 and 7), the remaining end of this conductor being equipped with a suitable terminal 64 so that the entire apparatus may be connected to any conventional "arc welding" generator (not shown).

The inner end portion of the holder 48 is provided with a relatively small axial bore 66 to receive an end portion of a dispensable electrode 68, this being preferably secured in the holder by a suitable set screw 70 located in a screw-threaded aperture with which the holder 48 is formed (see Figures 5 and 6). In addition, the sleeve 24 and the guide member 14 are equipped with registering openings 72, so that when the sleeve 24 and the holder 48 are slid as to place the aperture therein in register with the openings 72, access may be had to the screw 70 for the purpose of securing or removing the electrode 68.

An insulating disk 74 is positioned in the guide member 14 immediately adjacent the end wall 18 and is formed with an aperture which is enough to slidably accommodate the electrode 68. However, the electrode freely extends through aligned openings 76, 78 provided respectively in the plate 18 and the extension 20, and it is to be noted that since the disk 74 is, of course, of insulating material, the electrode 68, the holder 48 and the cable 62 with the terminal 64 are electrically insulated from the remaining components of the apparatus.

Having thus described the construction of the invention, the method of operation will now be explained.

Assuming that it is desired to "tack" two superimposed pieces of material, the apparatus is brought to a position where the edge 22 of the extension 20 engages one of the pieces, whereupon pressure is exerted on the handle 58 in the direction of the arrow 38 so that the elements 24, 46, 42 and 26 all slide in the direction of the arrow 38, bringing the point 80 of the electrode 68 in contact with the work. This action is, of course, performed against the resiliency of the springs 34, which become compressed in their pockets 16 by the pressure pads 32.

The tacking operation will, of course, be effected as soon as the electrode 68 is brought in contact with the work, it being understood that the work itself is "grounded" to the electrical generator to which the terminal 64 of the cable 62 is connected. The extension or chamber 20 will effectively enclose the arc while the tacking operation takes place, thus protecting the operator and the bystanders from sustaining injury to their eyes.

Upon completion of the tacking operation the apparatus may be removed from the work, and it is to be noted that while this removal takes place, the compression springs 34 will effectively urge the guide 14 and extension 20 in engagement with the work as indicated by the arrow 38, by virtue of which arrangement the tacked pieces of work will be retained in contact during the critical period while the apparatus is being moved therefrom, and while the arc is formed when the electrode is separated from the work, so that the tacked bond will have an adequate opportunity to set and become secure. Needless to say, as soon as the apparatus is fully removed from the work, the springs 34 will be fully expanded, and it will be observed that suitable stop screws 82 are provided in the open end portion of the pockets 16, these stop screws being engageable by the pads 32 whereby excessive outward sliding of the holder 48 is prevented.

As the electrode 68 becomes burned after successive engagements with the work, it may be advanced by simply rotating the adjusting nut 52, thus sliding the holder 48 in the elements 24, 46 so as to compensate for the diminishing length of the electrode as will be clearly apparent.

It is believed that the advantages and use of the invention will be readily understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In an arc spot welding apparatus, the combination of an elongated sleeve of insulating material, an electrode holder positioned in said sleeve, an elongated guide slidable on one end portion of said sleeve and affording an electrode receiving chamber, said guide having an outer end wall provided with an opening communicating with said chamber, a pair of elongated pockets provided longitudinally at opposite sides of the guide exteriorly of the chamber, a pair of fingers secured to said sleeve and having laterally angulated end portions slidable in said pockets, a retractable electrode extending slidably through said opening into said chamber and having its inner end secured in said holder, and compression springs provided in said pockets and bearing against the angulated end portions of said fingers for retracting said electrode into said chamber.

2. In an arc spot welding apparatus, the combination of an elongated sleeve of insulating material having a polygonal cross section, said sleeve consisting of a pair of longitudinally aligned sections having spaced adjacent ends, a handle member rigidly connecting said sections together and comprising a hollow body provided with a lateral opening and a pair of longitudinally aligned sockets at the opposite ends of said body, the adjacent end portions of said sleeve sections being secured in the respective sockets, an elongated electrode holder having a polygonal cross section slidable but non-rotatable in said sleeve sections, said holder being provided with screw threads, and an adjusting nut rotatably positioned in said body between the adjacent ends of said sections, said nut operatively engaging the screw threads on said holder and a portion thereof projecting outwardly from said body through said opening.

HUGH S. BOWEN.

REFERENCES CITED

The following references are of record in the file of this patent:

UNITED STATES PATENTS

| Number | Name | Date |
|---|---|---|
| 1,359,620 | Ritchey et al. | Nov. 23, 1920 |
| 2,360,160 | Pickhaver | Oct. 10, 1944 |